United States Patent [19]
Chambers et al.

[11] Patent Number: 5,764,642
[45] Date of Patent: Jun. 9, 1998

[54] SYSTEM FOR COMBINING DATA PACKETS FROM MULTIPLE SERIAL DATA STREAMS TO PROVIDE A SINGLE SERIAL DATA OUTPUT AND METHOD THEREFOR

[75] Inventors: Peter Chambers, Scottsdale; Dave Evoy, Tempe, both of Ariz.

[73] Assignee: VLSI Technology, Inc., San Jose, Calif.

[21] Appl. No.: 578,120

[22] Filed: Dec. 26, 1995

[51] Int. Cl.$^6$ ............................................. H04J 3/02
[52] U.S. Cl. ........................................ 370/462; 370/537
[58] Field of Search ............................ 370/462, 461, 370/470, 537, 538, 540, 916, 438, 445, 447

[56] References Cited

U.S. PATENT DOCUMENTS

| | | | |
|---|---|---|---|
| 4,630,260 | 12/1986 | Toy et al. | 370/355 |
| 5,008,880 | 4/1991 | Azuma | 370/462 |
| 5,103,446 | 4/1992 | Fischer | 370/236 |
| 5,453,983 | 9/1995 | O'Connell et al. | 370/438 |
| 5,457,688 | 10/1995 | Andersen | 370/449 |
| 5,502,718 | 3/1996 | Lane et al. | 370/414 |
| 5,524,213 | 6/1996 | Dais et al. | 395/200.17 |
| 5,541,932 | 7/1996 | Nguyen et al. | 370/462 |

Primary Examiner—Alpus H. Hsu
Assistant Examiner—Kwang B. Yao
Attorney, Agent, or Firm—Harry M. Weiss; Jeffrey D. Moy; Harry M. Weiss & Associates, P.C.

[57] ABSTRACT

The present invention relates to a system that can combine data packets from two serial data streams to provide a single uncorrupted serial data output. The system is comprised of an internal data source and an external data source which each generates serial bit packets containing system information. The outputs of both the internal and external sources are coupled to a packet arbiter which combines the serial bit packet from the internal data source with the serial bit packet from the external data source to form an uncorrupted combined serial data output stream.

13 Claims, 1 Drawing Sheet

SYSTEM FOR COMBINING DATA PACKETS FROM MULTIPLE SERIAL DATA STREAMS TO PROVIDE A SINGLE SERIAL DATA OUTPUT AND METHOD THEREFOR

BACKGROUND OF THE INVENTION

1. Field of the Invention

This invention relates generally to shift registers and, more specifically, to a packet arbiter mechanism that can combine data packets from two serial data streams to provide a single uncorrupted serial data output.

2. Background of the Invention

Serial data streams consisting of multiple bit packets of system information are often sent from one system component to another. However, current systems have no provision to extend the system component to be able to receive a combined data stream consisting of uncorrupted multiple bit discrete packets from two or more different sources.

Therefore, a need existed to provide a system that could combine at least two serial data streams and send the combined data stream to a system component. The resulting combined data stream must contain the uncorrupted multiple bit packets from two or more different sources. The system must not require a plurality of wires coupling the two sources of data streams together in order to produce the combined data stream. Furthermore, delays in combining the multiple bit packets must be minimized.

SUMMARY OF THE INVENTION

In accordance with one embodiment of the present invention, it is an object of the present invention to provide a system that combines the serial data stream from at least two separate sources.

It is another object of the present invention to provide a system that combines the serial data stream from at least two separate sources such that the combined data stream contains the uncorrupted multiple discrete packets from the two or more separate sources.

It is still another object of the present invention to provide a system that combines the serial data stream from at least two separate sources that does not require a plurality of wires coupling the two or more sources of serial data streams together in order to produce the combined data stream output.

It is a further object of the present invention to provide a system that combines the serial data stream from at least two separate sources that minimizes the delays during the combination of the two or more serial data streams.

BRIEF DESCRIPTION OF THE PREFERRED EMBODIMENTS

In accordance with one embodiment of the present invention, a system for combining data packets from multiple serial data streams to produce a single data stream output is disclosed. The system comprises internal data source means for generating a serial bit packet containing system information; external data source means for generating a serial bit packet containing system information; and packet arbiter means coupled to the internal data source means and the external data source means for combining the serial bit packet from the internal data source means with the serial bit packet from the external data source means to form an uncorrupted combined serial data output stream.

The packet arbiter means is comprised of shift register means coupled to an output of the external data source means for receiving the serial bit packet from the external data source means and for shifting the serial bit packet from the external data source means to a serial output of the shift register means. OR gate means are coupled to the serial output of the shift register means and to a data output of the internal data source means for outputting an uncorrupted combined serial data output of system data. The combined serial data output is comprised of system information from the serial bit packet of the internal data source means and system information from the serial bit packet of the external data source means. AND gate means having an input coupled to a parallel output of the shift register means and an output coupled to an enabling input of the internal data source means are used for signaling the internal data source means when to output the serial bit packet to the OR gate means.

In accordance with another embodiment of the present invention, a method for combining data packets from multiple serial data streams to provide a single data output is disclosed. The method is comprised of the steps of: providing internal data source means for generating a serial bit packet containing system information; providing external data source means for generating a serial bit packet containing system information; and providing packet arbiter means coupled to the internal data source means and the external data source means for combining the serial bit packet from the internal data source means with the serial bit packet from the external data source means to form an uncorrupted combined serial data output stream.

The step of providing packet arbiter means further comprises the steps of: providing shift register means coupled to an output of the external data source means for receiving the serial bit packet from the external data source means and for shifting the serial bit packet from the external data source means to a serial output of the shift register means; providing OR gate means coupled to the serial output of the shift register means and to a data output of the internal data source means for outputting an uncorrupted combined serial data output of system data, the combined serial data output comprising system information from the serial bit packet from the internal data source means and system information from the serial bit packet from the external data source means; and providing AND gate means having an input coupled to a parallel output of the shift register means and an output coupled to an enabling input of the internal data source means for signaling the internal data source means when to output the serial bit packet to the OR gate means.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
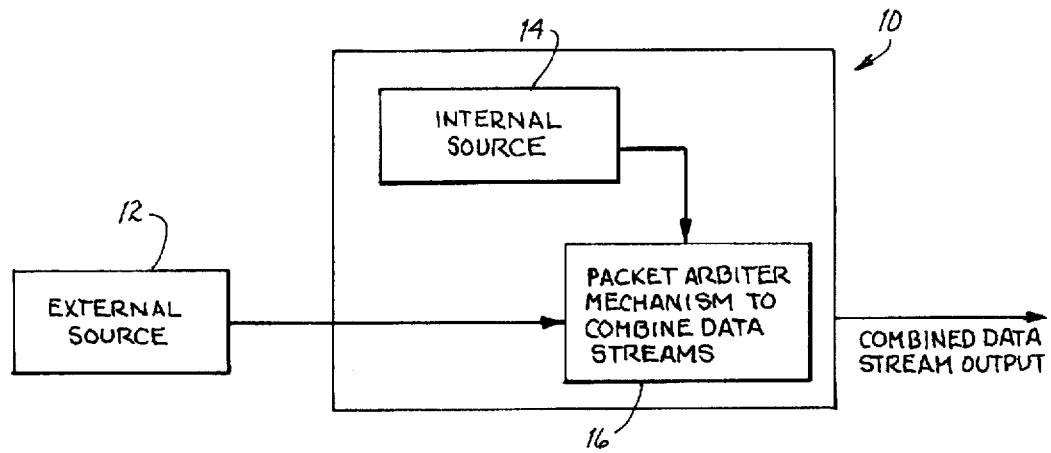
FIG. 1 shows a simplified block diagram illustrating a system for combining data packets from multiple serial data streams to produce a single data output stream.

Referring to FIG. 1, a system for combining data packets from multiple serial data streams to provide a single data output stream (hereinafter system) 10 is shown. The system 10 is comprised of an external source 12 which sporadically generates serial bit packets (see FIG. 2) containing system information. An internal source 14 also generates similar serial bit packets which contain system information. The incoming data from the serial bit packet of the external source 12 and the data from the serial bit packet of the internal source 14 are combined in a packet arbiter 16. The packet arbiter 16 joins the data from the two serial streams to produce a combined data stream which is comprised of the uncorrupted serial bit packets from the external source 12 and the internal source 14.

Figure 2:
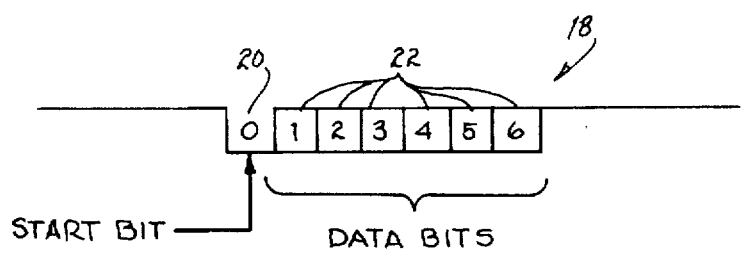
FIG. 2 shows a simplified block diagram illustrating the data packet format.

Referring to FIG. 2, a serial bit packet 18 which may be generated by either the external source 12 (FIG. 1) or the internal source 14 (FIG. 1) is shown. The bit streams from the internal and external sources 12, 14 are normally in a logic high state (i.e., one) and are driven low to indicate that a serial bit packet 18 is starting. The size of the serial bit packet 18 is deterministic (i.e., a set number of bits). Thus, once the bit stream changes from a logic high state (i.e., one) to a logic low state (i.e., zero) valid data bits will follow. Furthermore, since the size of the serial bit packet 18 is deterministic, the serial bit packet 18 needs just a single start bit 20 and no stop bits. In the preferred embodiment of the present invention, the serial bit packet 18 is a seven bit packet having one start bit 20 and six data bits 22.

Figure 3:
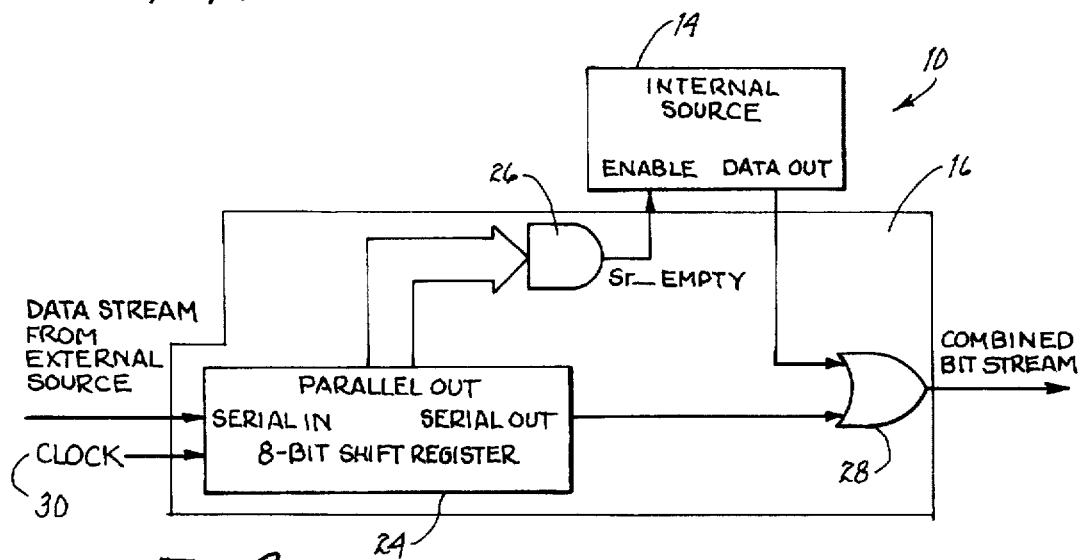
FIG. 3 shows another simplified block diagram of the system of FIG. 1 with a more detailed block diagram of a packet arbiter.

Referring to FIG. 3, wherein like numerals and symbols designate like elements, another block diagram of the system 10 is shown. As can be seen from FIG. 3, the arbiter 16 is comprised of a shift register 24. In the preferred embodiment of the present invention, the shift register 24 is an eight bit shift register. The shift register 24 is coupled to an output of the external source 12 (FIG. 1). Thus, the bit stream from the external source 12 is fed directly into the shift register 24. As stated above, the bit streams are normally in a logic high (i.e., one) state. So long as the shift register 24 contains all ones, then no start bit has been received by the shift register 24 and there is enough room in the shift register 24 for a complete seven bit serial bit packet 18 (FIG. 2).

A clock 30 is coupled to an input of the shift register 24. The clock 30 is used for synchronizing the transfer of bits from the serial bit packet 18 to the arbiter 16. The clock 30 is also used for synchronizing the shifting of the serial bit packet 18 from the external source 12 through the shift register 24. Once the shift register 24 receives a valid start bit 20 (FIG. 2), the shift register 24 knows that the following six clock cycles will contain valid data bits 22 (FIG. 2).

An AND gate 26 is coupled to a parallel output of the shift register 24 and to an enabling input of the internal source 14. When the shift register 24 is empty (i.e., the bit stream from the external source 12 has not been driven from high to low to indicate a start bit) the AND gate 26 signals the internal source 14 that the shift register 24 is empty and the internal source 14 is free to drive out a complete serial bit packet 18. The internal source 14 is free to continue to drive out a complete serial bit packet 18 until the shift register 24 receives a start bit 20 from the bit stream of the external source 12. In the preferred embodiment of the present invention, when the internal source 14 is enabled, the internal source 14 has at least eight bit times (eight clock cycles) to send out a serial bit packet 18.

When the bit stream from the external source 12 goes from high to low, the shift register 24 has received a valid start bit 20. The AND gate 26 sends a signal which disables the internal source 14 from sending out a serial bit packet 18. Note that the internal source 14 must be able to buffer events until the shift register 24 is empty. This is typically not a problem since the internal source 14 effectively services its own event inputs in strict order. The events remain pending until serviced. The serial bit packet 18 from the external source is then shifted through the shift register 24. Note that in the preferred embodiment of the present invention, there is an eight clock delay until the serial bit packet 18 emerges from the output of the shift register 24.

An OR gate 28 is coupled to the serial output of the shift register 24 and to a data output of the internal source 14. The OR gate receives the outputs from the external source 12 and the internal source 14 and outputs an uncorrupted combined serial data output. The combined serial data output is comprised of system information from the serial bit packet 18 of the internal source 14 and system information from the serial bit packet 18 of the external source 12.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for combining data packets from multiple serial data streams to provide a single data output comprising, in combination:

internal data source means for generating a serial bit packet containing system information;

external data source means for generating a serial bit packet containing system information; and packet arbiter means coupled to said internal data source means and said external data source means for combining said serial bit packet from said internal data source means with said serial bit packet from said external data source means to form an uncorrupted combined serial data output stream; wherein said packet arbiter means comprises:

shift register means coupled to an output of said external data source means for receiving said serial bit packet from said external data source means and for shifting said serial bit packet from said external data source means to a serial output of said shift register means, wherein said shift register means can store a complete 7-bit serial packet;

OR gate means coupled to said serial output of said shift register means and to a data output of said internal data source means for outputting an uncorrupted combined serial data output of system data, said combined serial data output comprising system information from said serial bit packet of said internal data source means and system information from said serial bit packet of said external data source means; and AND gate means having an input coupled to a parallel output of said shift register means and an output coupled to an enabling input of said internal data source means for signaling said internal data source means when to output said serial bit packet to said OR gate means.

2. A system for combining data packets from multiple serial data streams in accordance with claim 1 wherein said serial bit packet of said internal data source means and said serial bit packet of said external data source means are of equal size.

3. A system for combining data packets from multiple serial data streams in accordance with claim 2 wherein said serial bit packet of said internal data source means and said serial bit packet of said external data source means are both seven bit packets, each of said packets having one start bit and six data bits.

4. A system for combining data packets from multiple serial data streams in accordance with claim 1 wherein said packet arbiter means further comprises clock means coupled to an input of said shift register means for synchronizing transfer of said serial bit packet from said internal data source and said serial bit packet from said external data source to said arbiter means.

5. A system for combining data packets from multiple serial data streams in accordance with claim 4 wherein said clock means further synchronizes shifting of said serial bit packet from said external data source means through said shift register means.

6. A system for combining data packets from multiple serial data streams in accordance with claim 1 wherein said internal data source means has at least eight clock cycles to transmit said serial bit packet to said OR gate means when said AND gate means sends a signal enabling said internal data source means.

7. A system for combining data packets from multiple serial data streams in accordance with claim 1 wherein said internal data source means can buffer system information in said internal data source means when said AND gate means disables said internal data source means from sending said serial bit packet to said OR gate means and said shift register means is shifting said serial bit packet from said external data source means to said serial output of said shift register means and to said OR gate means.

8. A method of combining data packets from multiple serial data streams to provide a single data output comprising the steps of:

providing internal data source means for generating a serial bit packet containing system information;

providing external data source means for generating a serial bit packet containing system information; and providing packet arbiter means coupled to said internal data source means and said external data source means for combining said serial bit packet from said internal data source means with said serial bit packet from said external data source means to form an uncorrupted combined serial data output stream, wherein said step of providing packet arbiter means further comprises the steps of:

providing shift register means coupled to an output of said external data source means for receiving said serial bit packet from said external data source means and for shifting said serial bit packet from said external data source means to a serial output of said shift register means, wherein said step of providing said shift register means further comprises the step of providing shift register means capable of storing a complete 7-bit serial packet;

providing OR sate means coupled to said serial output of said shift register means and to a data output of said internal data source means for outputting an uncorrupted combined serial data output of system data, said combined serial data output comprising system information from said serial bit packet from said internal data source means and system information from said serial bit packet from said external data source means; and providing AND gate means having an input coupled to a parallel output of said shift register means and an output coupled to an enabling input of said internal data source means for signaling said internal data source means when to output said serial bit packet to said OR gate means.

9. The method of claim 8 wherein said steps of providing said internal data source means for generating said serial bit packet and providing said external data source means for generating said serial bit packet further comprises the step of providing said internal data source means for generating said serial bit packet and providing said external data source means for generating said serial bit packet wherein said serial bit packet of said internal data source means and said serial bit packet of said external data source means are of equal size.

10. The method of claim 9 wherein said step of providing said serial bit packet of said internal data source means and said serial bit packet of said external data source means of equal size further comprises the step of providing said serial bit packet of said internal data source means and said serial bit packet of said external data source means each having a seven bit packet, said seven bit packet having one start bit and six data bits.

11. The method of claim 8 wherein said step of providing packet arbiter means further comprises the step of providing clock means coupled to an input of said shift register means for synchronizing transfer of said serial bit packet from said internal data source and said serial bit packet from said external data source to said arbiter means.

12. The method of claim 11 wherein said clock means further synchronizes shifting of said serial bit packet from said external data source means through said shift register means.

13. The method of claim 8 wherein said step of providing AND gate means further comprises the steps of:

sending said serial bit packet from said internal data source means to said OR gate means when said AND gate means enables said internal data source means, said internal data source means having at least eight clock cycles to transmit said serial bit packet from said internal data source means to said OR gate means;

disabling said internal data source means from sending said serial bit packet to said OR gate means for at least eight clock cycles when said AND gate means disables said internal data source means; and shifting said serial bit packet from said external data source means through said shift register means and to said OR gate means when said AND gate means disables said internal data source means from sending said serial bit packet from said internal data source means to said OR gate means.

* * * * *